US007295657B1

(12) United States Patent
Keohane et al.

(10) Patent No.: US 7,295,657 B1
(45) Date of Patent: Nov. 13, 2007

(54) AUTOMATED SELECTION OF A BACKUP RECIPIENT AND DISTRIBUTION OF AN INSTANT MESSAGING REQUEST TO THE BACKUP RECIPIENT

(75) Inventors: Susann Marie Keohane, Austin, TX (US); Gerald Francis McBrearty, Austin, TX (US); Shawn Patrick Mullen, Buda, TX (US); Jessica Murillo, Round Rock, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/006,125

(22) Filed: Dec. 7, 2004

(51) Int. Cl.
*H04M 1/64* (2006.01)
(52) U.S. Cl. .............................. 379/88.23; 379/211.02; 370/352; 709/206
(58) Field of Classification Search ........... 379/211.02, 379/201.04, 88.23; 715/760, 780; 455/417; 709/206
See application file for complete search history.

(56) References Cited

U.S. PATENT DOCUMENTS

| 5,579,375 | A  | * | 11/1996 | Ginter ........................ 455/417 |
| 6,728,360 | B1 | * | 4/2004  | Brennan ................ 379/211.04 |
| 6,751,299 | B1 |   | 6/2004  | Brown et al. |
| 6,785,266 | B2 |   | 8/2004  | Swartz |
| 6,823,057 | B1 |   | 11/2004 | Pershan et al. |
| 6,914,970 | B2 |   | 7/2005  | Huang et al. |
| 6,941,345 | B1 |   | 9/2005  | Kapil et al. |
| 6,954,524 | B2 | * | 10/2005 | Gibson .................. 379/211.02 |
| 6,956,941 | B1 |   | 10/2005 | Duncan et al. |
| 2002/0188620 | A1 |   | 12/2002 | Doss et al. ............... 707/104.1 |
| 2003/0182356 | A1 |   | 9/2003  | Limoges et al. ............ 709/108 |
| 2004/0267887 | A1 | * | 12/2004 | Berger et al. ............... 709/206 |

OTHER PUBLICATIONS

"Methodology for Query Search Structure Addressing for Calendar Users", IBM Technical Disclosure Bulletin, Apr. 1993, vol. 36 Pub. 4, pp. 449-450.

(Continued)

*Primary Examiner*—Gerald Gauthier
(74) *Attorney, Agent, or Firm*—Marilyn Smith Dawkins; Amy J. Pattillo

(57) ABSTRACT

A method, system, and program for automated selection of a backup recipient and distribution of an instant messaging request to the backup recipient are provided. A communication support system detects a messaging request initiated by a requester for an intended recipient. The communication support system determines whether the intended recipient is available to respond to the messaging request from the requester. If the intended recipient is unavailable to respond to the messaging request from the requester, the communication support system searches at least one of a directory entry, a backup directory entry, and a schedule entry for the intended recipient to identify a designated backup for the messaging request. In particular, the designated backup recipient is selected from among multiple available backups where at least one characteristic of the messaging request matches at least one from among a current time period, a requester identity, and an intended subject matter specified in association with the designated backup recipient. Once the communication system selects a backup recipient, then the messaging request is distributed to the selected backup recipient, wherein the selected backup recipient is enabled then to respond to the messaging request.

20 Claims, 9 Drawing Sheets

OTHER PUBLICATIONS

Jackson, BJ et al., "Method for Ambiguous Address Resolution of Potential Calendar Users", IBM Technical Disclosure Bulletin, Apr. 1993, vol. 36 Pub. 4, pp. 29-30.

Fitzpatrick, GP et al., "Vocalized Appointment Cancellation Informer", IBM Technical Disclosure Bulletin, Aug. 1993, vol. 36 Pub. 8, pp. 513-516.

Jackson, BK et al., "Calendar Delete Event Telephone Notification Mechanism", IBM Technical Disclosure Bulletin, Mar. 1994, vol. 37 Pub. 3, pp. 137-138.

Williams, ML, "Calendar Scheduling Teleconference Communication Mechanism", IBM Technical Disclosure Bulletin, Mar. 1994, vol. 37 Pub. 3, pp. 561-562.

Salahshour, A and Williams, ML, "Automatic Calendar Update with User's Location Information", IBM Technical Disclosure Bulletin, Mar. 1994, vol. 37 Pub. 3, pp. 665-666.

Johnson, WJ and Weber, OW, "Method and Apparatus for Automatic Contextual Call Return, Calendaring, and Address Book Search", IBM Technical Disclosure Bulletin, Apr. 1994, vol. 37 Pub. 4A, pp. 373-374.

Jackson, BK et al., "Calendar Agenda Audio Notification", IBM Technical Disclosure Bulletin, Mar. 1994, vol. 37 Pub. 3, pp. 331-332.

* cited by examiner

DIRECTORY SYSTEM ENTRY 304

USER DIRECTORY LISTING
NAME: JOHN ADLER
EMAIL: JOHNAD@US.IBM.COM
WORK IM ID: JOHNAD
PERSONAL IM ID: JOHNJOHN
WORK PHONE: 512-444-4444
CELL PHONE: 512-111-1111
CURRENT PROJECTS: PROJECT XY, PROJECT Z
BUSINESS ROLE: PROGRAMMER

CALENDAR SYSTEM ENTRY 306

MONDAY, 10AM-1PM
LOCATION: DOCTOR'S APPOINTMENT
AVAILABILITY: CELL PHONE
SPECIFIC BACKUPS:
CHAT REQUESTER
DR. SMITH -> WIFE (BLIND) (0)
JAMES DAVIS -> EMPLOYEE C (NO DISCLOSE) (2)
CHAT SUBJECT MATTER
PROJECT XY -> EMPLOYEE A (BLIND) (1)
PROJECT Z -> 1 - EMPLOYEE D (0) (BLOCK REPLY); 2 - ADMINISTRATOR (0)

BACKUP SYSTEM ENTRY 308

PHONE CALLS
GENERAL INTERNAL-> ENGINEER GROUP A
CHAT REQUESTER
GENERAL INTERNAL-> SAMJONES

*Fig. 4*

CHAT BACKUP SPECIFICATION WINDOW 502

CRITERIA:
FROM ☐ —504
SUBJECT MATTER ☐ —506
OTHER ☐ —508

BACKUP ☐ —510
BLIND ☒ NO DISCLOSE ☒ —514
512—BLOCK REPLY ☒ —515

AVAILABILITY DEPTH ☐ —516
TIME PERIOD | OPEN CALENDAR —518

*Fig. 5*

AUTOMATED SELECTION OF A BACKUP RECIPIENT AND DISTRIBUTION OF AN INSTANT MESSAGING REQUEST TO THE BACKUP RECIPIENT

CROSS-REFERENCE TO RELATED APPLICATIONS

The present application is related to the following co-pending application, and incorporated herein by reference: U.S. patent application Ser. No. 11/006,392.

BACKGROUND OF THE INVENTION

1. Technical Field

The present invention relates in general to improved messaging systems and in particular to improving automated responses when an intended recipient is not available. Still more particularly, the present invention relates to automated selection of a backup recipient and distribution of an instant messaging request to the backup recipient.

2. Description of the Related Art

The use of electronic messaging and communications, such as electronic mail (e-mail), instant messaging, and text messaging has expanded rapidly over the last few years. Typically, an e-mail application, such as Lotus Notes (Lotus Notes is a registered trademark of International Business Machines Corporation), provides a user interface between the user and an e-mail server that sends and receives e-mail via a network, such as the Internet. In addition, typically, instant messaging applications and chat applications, such as AOL Instant Messenger (AIM) (AOL and AIM are registered trademarks of AOL, Inc.), provide a user interface between the user and an instant messaging server that opens a communication channel between at least two users and facilitates distribution of messages through that communication channel.

Since instant messaging is essentially "real-time" communication, this type of electronic communication is often used when users need to communicate immediately about a particular topic. As it evolves, instant messaging is commonly used as a substitute for telephone calls because the conversation can happen in "real-time" but all parties to the messaging session can remain at their computer system and respond when needed.

As much the "real-time" communication element is a characteristic of instant messaging communications, many instant messaging applications and devices that facilitate instant messaging now allow users to set an "availability setting" indicating that the user is "logged off", "away from the desk", "available", and other settings that indicate a level of availability. In one example, a user may designate for a particular availability setting to be automatically selected when no user activity at a particular device is detected over a particular period of time.

A disadvantage of an "availability setting" designating an intended recipient's availability is that when the intended recipient is not available, the initiator of a messaging session may still need to communicate with someone about the intended subject matter of the messaging session, but not know who to contact next. In one example, some employers provide a searchable directory of employees to employees with a backup designated for each employee, where the backup listing may indicate a way to contact the backup employee to initiate a messaging session. A backup directory, however, is limited because an employee may use instant messaging to communicate with employees and non-employees, where it would not be appropriate for an employee backup to receive every message request. For example, if a friend sends a message request to a first employee, who is currently unavailable, the first employee would not want that message request forwarded to a second employee who is a backup to the first employee for business related topics. In addition, a static backup directory is limited because in addition to the intended subject matter of a message request, other factors might effect who an unavailable intended recipient would want to function as a backup recipient for messaging requests. For example, during the work day the intended recipient might want a secretary to function as a backup recipient, but designate a different backup recipient during non-working hours. In another example, an intended recipient may expect to communicate with a particular user via a messaging session and it would be advantageous to allow that intended recipient to designate a particular backup recipient for any message requests received from that particular user if the intended recipient is unavailable. Current backup directories are limited because they do not provide for schedule based and requester based backup designations.

Therefore, in view of the foregoing, it would be advantageous to provide a method, system, and program for the selection of a backup recipient for an instant messaging request for an intended recipient who is unavailable based on criteria such as the intended subject matter of the communication, the intended recipient's schedule, and the identity of the initiator of the communication. Further, it would be advantageous to automatically select a backup recipient and automatically forward the instant messaging request to the backup recipient, such that the initiator is not required to manually search a backup directory and then manually initiate a communication to a backup recipient.

SUMMARY OF THE INVENTION

Therefore, the present invention provides an improved messaging systems and in particular to provides an improved method, system, and program for filing electronic messages within messaging systems. Still more particularly, the present invention provides a method, system, and program for improving automated responses when an intended recipient is not available. Additionally, the present invention provides a method, system, and program for automated selection of a backup recipient and distribution of an instant messaging request to the backup recipient.

In one embodiment a messaging request from a requester to an intended recipient is detected at a communication support system. The communication support system determines whether the intended recipient is available to respond to the messaging request from the requester. If the intended recipient is unavailable to respond to the messaging request from the requester, the communication support system searches at least one of a directory entry, a backup directory entry, and a schedule entry for the intended recipient to identify a designated backup for the messaging request. In particular, the designated backup recipient is selected from among multiple available backups where at least one characteristic of the messaging request matches at least one from among a current time period, a requester identity, and an intended subject matter specified in association with the designated backup recipient. Once the communication system selects a backup recipient, then the messaging request is distributed to the selected backup recipient, wherein the selected backup recipient is enabled then to respond to the messaging request.

In selecting a backup recipient for the messaging request, the communication support system may prompt the requester with a request for the requester to specify and intended subject matter of a communication proceeding from the message request. Then, responsive to receiving a particular intended subject matter from the requester, the communication support system parses the particular intended subject matter for at least one subject keyword and searches at least one from among the directory entry for the intended recipient and the schedule for the intended recipient for the designated backup specified to respond to the message request for the subject keyword.

In addition, in selecting a backup recipient for the messaging request, the communication support system may identify a selection of matching backups from the multiple available backups and then select the designated backup recipient from among the matching backups based on a backup order preference. Further, if a first designated backup recipient is not available, then the communication support system may identify a next backup recipient form the selection of matching backups or may search the first designated backup recipient's backups for a matching backup recipient.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4 is a block diagram illustrating entries in a directory system, calendar system, and backup system for a particular intended recipient in accordance with the method, system, and program of the present invention;

FIG. 5 is an illustrative example depicting a backup preference interface through which a user may select backup preferences in accordance with the method, system, and program of the present invention;

DETAILED DESCRIPTION OF THE PREFERRED EMBODIMENT

Figure 1:
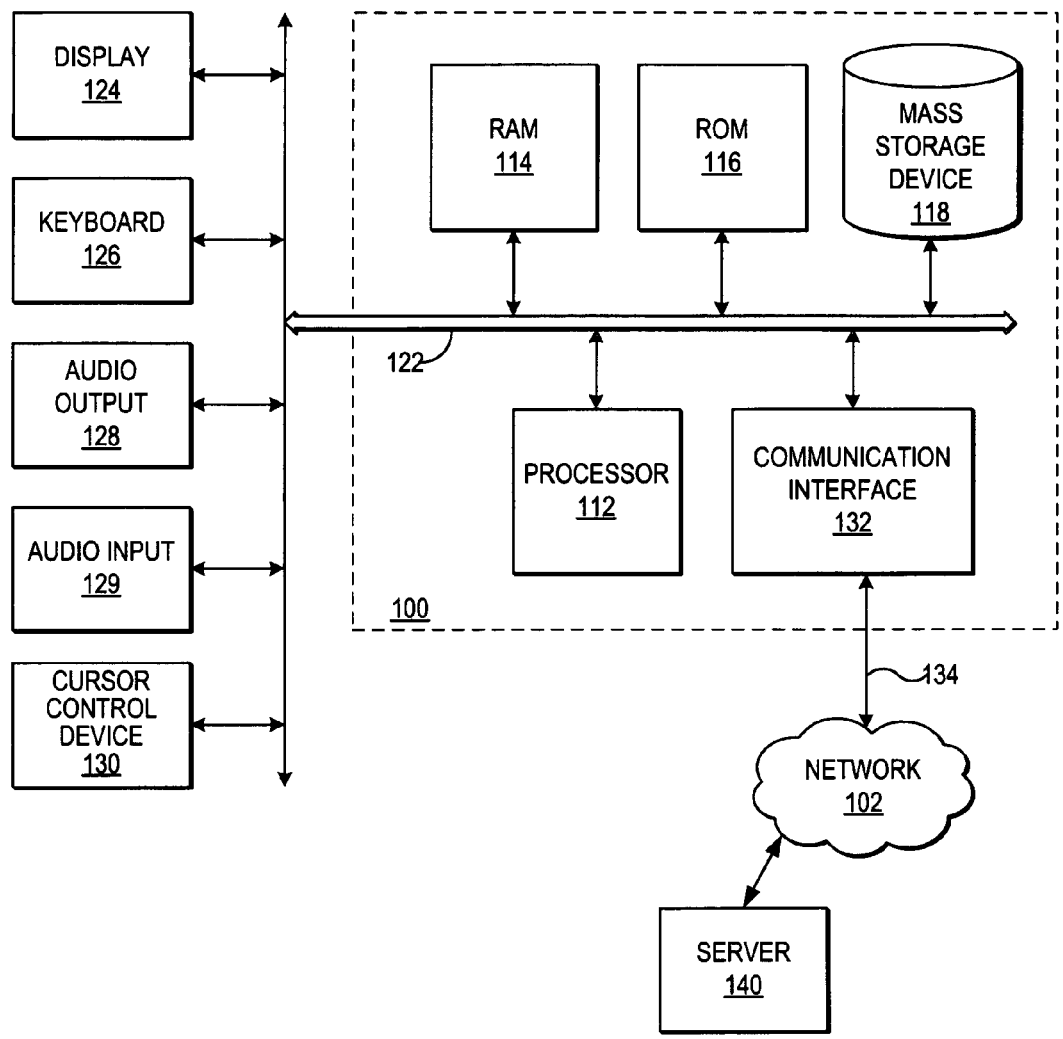
FIG. 1 is a block diagram depicting a computer system in which the present method, system, and program may be implemented.

Referring now to the drawings and in particular to FIG. 1, there is depicted one embodiment of a system through which the present method, system, and program may be implemented. The present invention may be executed in a variety of systems, including a variety of computing systems and electronic devices.

Computer system 100 includes a bus 122 or other communication device for communicating information within computer system 100, and at least one processing device such as processor 112, coupled to bus 122 for processing information. Bus 122 preferably includes low-latency and higher latency paths that are connected by bridges and adapters and controlled within computer system 100 by multiple bus controllers. When implemented as a server system, computer system 100 typically includes multiple processors designed to improve network servicing power.

Processor 112 may be a general-purpose processor such as IBM's PowerPC™ processor that, during normal operation, processes data under the control of operating system and application software accessible from a dynamic storage device such as random access memory (RAM) 114 and a static storage device such as Read Only Memory (ROM) 116. The operating system preferably provides a graphical user interface (GUI) to the user. In a preferred embodiment, application software contains machine executable instructions that when executed on processor 112 carry out the operations depicted in the flowcharts of FIGS. 8, 9A-9B, and other operations described herein. Alternatively, the steps of the present invention might be performed by specific hardware components that contain hardwired logic for performing the steps, or by any combination of programmed computer components and custom hardware components.

The present invention may be provided as a computer program product, included on a machine-readable medium having stored thereon the machine executable instructions used to program computer system 100 to perform a process according to the present invention. The term "machine-readable medium" as used herein includes any medium that participates in providing instructions to processor 112 or other components of computer system 100 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 100 can read and which is suitable for storing instructions. In the present embodiment, an example of a non-volatile medium is mass storage device 118 which as depicted is an internal component of computer system 100, but will be understood to also be provided by an external device. Volatile media include dynamic memory such as RAM 114. Transmission media include coaxial cables, copper wire or fiber optics, including the wires that comprise bus 122. Transmission media can also take the form of acoustic or light waves, such as those generated during radio frequency or infrared data communications.

Moreover, the present invention may be downloaded as a computer program product, wherein the program instructions may be transferred from a remote computer such as a server 140 to requesting computer system 100 by way of data signals embodied in a carrier wave or other propagation medium via a network link 134 (e.g. a modem or network connection) to a communications interface 132 coupled to bus 122. Communications interface 132 provides a two-way data communications coupling to network link 134 that may be connected, for example, to a local area network (LAN), wide area network (WAN), or directly to an Internet Service Provider (ISP). In particular, network link 134 may provide wired and/or wireless network communications to one or more networks.

Network link 134 in turn provides data communication services through network 102. Network 102 may refer to the worldwide collection of networks and gateways that use a particular protocol, such as Transmission Control Protocol (TCP) and Internet Protocol (IP), to communicate with one another. Network link 134 and network 102 both use electrical, electromagnetic, or optical signals that carry digital data streams. The signals through the various networks and the signals on network link 134 and through communication interface 132, which carry the digital data to and from computer system 100, are exemplary forms of carrier waves transporting the information.

When implemented as a server system, computer system 100 typically includes multiple communication interfaces accessible via multiple peripheral component interconnect (PCI) bus bridges connected to an input/output controller. In this manner, computer system 100 allows connections to multiple network computers.

In addition, computer system 100 typically includes multiple peripheral components that facilitate communication. These peripheral components are connected to multiple controllers, adapters, and expansion slots coupled to one of the multiple levels of bus 122. For example, an audio output device 128 and audio input device 129 are connectively enabled on bus 122 for controlling audio outputs and inputs. A display device 124 is also connectively enabled on bus 122 for providing visual, tactile or other graphical representation formats and a cursor control device 130 is connectively enabled on bus 122 for controlling the location of a pointer within display device 124. A keyboard 126 is connectively enabled on bus 122 as an interface for user inputs to computer system 100. In alternate embodiments of the present invention, additional input and output peripheral components may be added.

Those of ordinary skill in the art will appreciate that the hardware depicted in FIG. 1 may vary. Furthermore, those of ordinary skill in the art will appreciate that the depicted example is not meant to imply architectural limitations with respect to the present invention.

Figure 2:
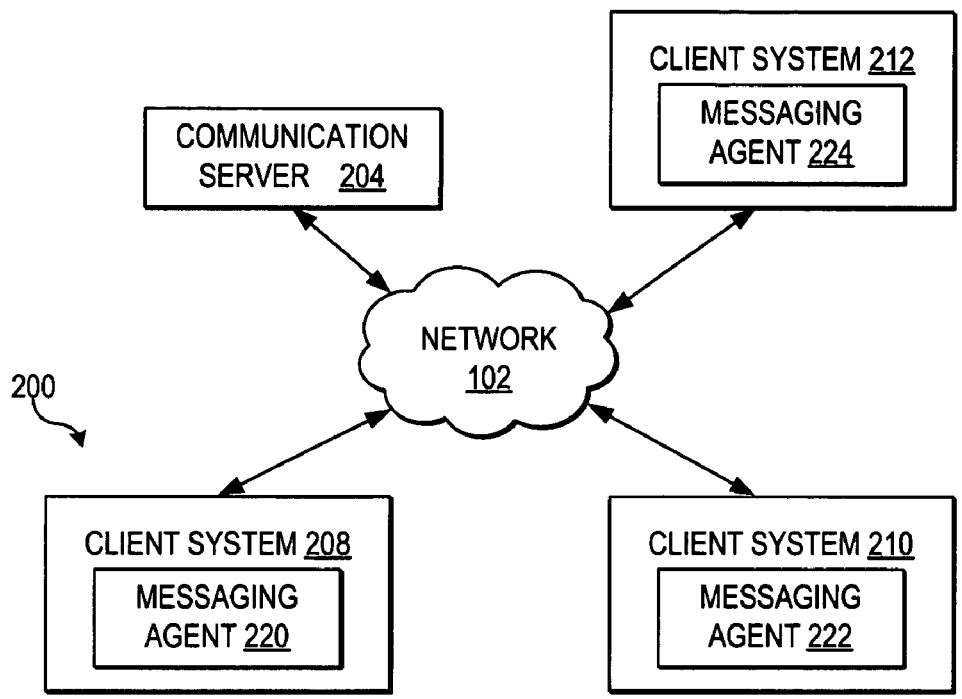
FIG. 2 is a block diagram depicting a distributed network system for facilitating distribution of electronic messages between a requester and a recipient for facilitating one embodiment of the present invention.

With reference now to FIG. 2, a block diagram depicts a distributed network system for facilitating distribution of electronic messages between a requester, an intended recipient, and a backup recipient for facilitating one embodiment of the present invention. Distributed network 200 is a network of computers in which one embodiment of the invention may be implemented. It will be understood that the present invention may be implemented in other embodiments of systems enabled to communicate via a connection.

In the embodiment, distributed network 200 contains network 102, which is the medium used to provide communications links between various devices and computers connected together within distributed network 200. Network 102 may include permanent connections such as wire or fiber optics cables and temporary connections made through telephone connections and wireless transmission connections, for example.

In the depicted example, a communication server 204 is communicatively connected to network 102 and three client systems 208, 210, and 212 are communicatively connected to network 102. It will be understood that each of communication server 204 and client systems 208, 210, and 212 may be distributed in geographically disparate locations throughout heterogeneous types of computing systems operating within disparate local networks. In addition, it will be understood that distributed network 200 may include additional services, clients, and other devices that are not shown.

In one embodiment, distributed network 200 includes a client/server environment where communication server 204 performs as a server for responding to requests and client systems 208, 210, and 212 perform as clients requesting services from communication server 204. The client/server environment of distributed network 200 may be implemented within many network architectures. In one example, distributed network 100 is the Internet with network 102 representing a worldwide collection of networks and gateways that use the TCP/IP suite of protocols to communicate with one another. The Internet is enabled by millions of high-speed data communication lines between major nodes or host computers. In another example, distributed network 200 is implemented as an intranet, a local area network (LAN), or a wide area network (WAN). Moreover, distributed network 200 may be implemented in networks employing alternatives to a traditional client/server environment, such as a grid computing environment.

Within distributed network 200, each of client systems 208, 210, and 212 and communication server 204 may function as both a "client" and a "server" and may be implemented utilizing a computer system such as computer system 100 of FIG. 1. Further, while the present invention is described with emphasis upon communication server 204 facilitating the transfer of electronic messages, the present invention may also be performed by clients 208, 210, and 212 engaged in peer-to-peer network communications via network 102.

In particular, communication server 204 may provide communication services for facilitating multiple types of messaging sessions including, but not limited to, e-mail communications, instant messaging communications, chat room communications, text messaging and other forms of communication supported within distributed network 200. Communication server 204 may facilitate messaging through text, voice, video and other types of communication media.

Each of client systems 208, 210, and 212 may include messaging applications or agents, such as messaging agents 220, 222, and 224 that enable a user at each of client systems 208, 210, and 212, through a supported user interface, to initiate a messaging session through communication server 204 to another one of the client systems 208, 210, and 212 and enable a user at each of client systems 208, 210, and 212 to receive messaging session requests and respond to messaging session requests.

In one example, a user may be continuously logged on at a client system through a messaging agent, such as client system 208 through messaging agent 220, such that any messaging requests received by communication server 204 for initiating communication with that user are automatically distributed to messaging agent 220. In another example, a user may be temporarily logged on at a client system through a messaging agent, such that communication server 204 must first determine which messaging agent is receiving communications for the user before distributing the message request to the messaging agent through a client system. If a user cannot be located logged in at a particular client system, then communication server 204 may store messaging requests for the user until a messaging agent communications with communication server 204 to authenticate the user at a particular client system.

Even though a user is logged in at one of client systems 208, 210, or 212, whether continuously or temporarily, the user may not be available to receive or respond to all messaging requests. As will be further described in detail, according to an advantage of the invention, when a user is not available to receive or respond to messaging requests, communication server 204 automatically selects a backup recipient for the messaging request and distributes the messaging request to the backup recipient.

In one embodiment, a user logged in at one of client systems 208, 210, or 212 may select an availability status indicator of the user's availability through one of messaging agents 220, 222 or 224. In general, a user may select an availability of "available" or "unavailable" and may specify messages to further clarify why the user is "available" or "unavailable". In addition, a user may select to log off communication server 204, through one of the messaging agents, as a way to select an availability status indicator of "unavailable".

It is important to note in distributing a message request to the backup recipient, communication server 204 may set up different types of communication channels. In one example, communication server 204 may designate the messaging request from the requester to the intended recipient as a chat session request and add the backup recipient to the chat session, such that all three parties are part of the chat based messaging session. In another example, communication server 204 may open a messaging session between the requester and the backup recipient and update the intended recipient with a real-time message log or a stored message log from the messaging session between the requester and the backup recipient. In addition, other messaging session configurations may be implemented depending on the types of communication channels and number of participants in a messaging session supported by communication server 204.

It will be understood that for electronic communications, a user may be identified by a user identifier (user ID) in multiple forms including, but not limited to, an e-mail address, an IM name, a chat name, a telephone number, and other electronic location identifiers. Further, it will be understood that a single user may be identified by multiple user IDs of the same and different forms.

Figure 3:
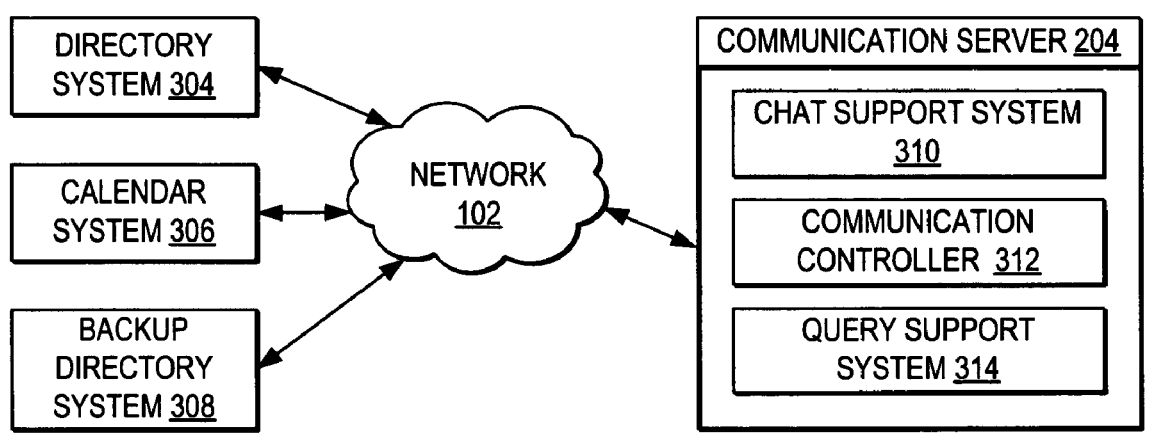
FIG. 3 is a block diagram depicting a communication server accessing a directory system, a calendar system, and a backup system to select a backup recipient for a messaging request for an intended recipient who is unavailable to receive or respond to messaging requests in accordance with the method, system, and program of the present invention.

Referring now to FIG. 3, there is depicted a block diagram of a communication server accessing a directory system, a calendar system, and a backup system to select a backup recipient for a messaging request for an intended recipient who is unavailable to receive or respond to messaging requests in accordance with the method, system, and program of the present invention. As depicted, communication server 204 is enabled to communicate with a directory system 304, a calendar system 306, and a backup system 308 via network 102 to determine an availability of an intended recipient of a messaging request and to select a backup recipient if the intended recipient is unavailable. It will be understood that communication server 204 may also communicate with other servers and may access other databases to determine an availability of an intended recipient of a messaging request and to select a backup recipient. For example, in determining an availability of an intended recipient, communication server 204 may also query a messaging agent or a device on which a messaging agent executes to determine an availability status of an intended recipient.

In one embodiment, communication server 204 includes at least one communication controller 312 that facilitates at least one type of communication stream or session. For example, communication controller 312 may facilitate instant message based communications. As previously described, client systems 208, 210, and 212 may include additional software, such as messaging agents 220, 222, and 224, that enables sending and receiving of instant message based communications via communication controller 312.

In addition, in one embodiment, communication server 204 includes a query support system 314. In one example, a user at a client system may need to initiate a communication with an intended recipient whose user ID is unknown to the user. The user may submit information that is known, such as a subject matter of the communication, a group name, or a telephone number to communication controller 312. Communication controller 312 may pass the information to query support system 314, wherein query support system 314 then attempts to identify a user ID for the intended recipient based on the information. Query support system 314 may first parse the information and specify the classification of information. For example, if a user enters "manager of product A", then query support system 314 may parse the information phrase into "manager" which is a role classification and "product A" which is an intended subject matter classification. In addition, query support system 314 may search directory system 304, calendar system 306, and backup system 308 with the parsed information to determine a user ID for the intended recipient. Further, as will be further described, the parsed information may be used to search directory system 304, calendar system 306, and backup system 308 to select a backup recipient for the intended recipient.

According to an advantage, communication server 204 also includes a chat support system 310. Chat support system 310 monitors whether an intended recipient is available to receive or respond to messaging requests; if the intended recipient is not available, then chat support system 310 automatically selects a backup recipient for the messaging request and automatically controls distribution of the messaging request to the backup recipient. As previously referenced, chat support system 310 may distribute the messaging request to the backup recipient by directing communication controller 312 to add the backup recipient to the messaging session or directing communication controller 312 to open a new messaging session between the requester and the backup recipient. Further, chat support system 310 may intervene as an additional participant in the messaging session to query the requester for additional information and to inform the requester, intended recipient, and backup recipient about the distribution of the messaging request to a backup recipient.

In one example, when chat support system 310 distributes the messaging request to the backup recipient, chat support system 310 informs the requester of the distribution and of the identity of the backup recipient. In another example, chat support system 310 may inform the requester of the distribution, but not inform the requester of the identity of the backup recipient. Further, in another example, chat support system may not inform the requester of the distribution or of the identity of the backup recipient.

When chat support system 310 informs the requester of the distribution to a backup recipient, chat support system 310 may allow the requester to send the initial message entry to the backup recipient. In another example, chat support system 310 may block the requester from sending the initial message entry, and may only allow the requester to respond to an initially message entry by the backup recipient.

In one embodiment, directory system 304 includes static and dynamic contact information about multiple users. Static information may include, for example, a user name, user instant messaging identifier, user email address, user work telephone number, user work cell phone number, user work group, user address, and other information that identifies a user and identifies contact information for the user. Dynamic information may include, for example, past and current projects for a user, a user location, a user holiday schedule, and other information about a user that the user or others may update and that identifies a user and identifies contact information for the user.

In addition, in one embodiment, calendar system 306 includes task entries that indicate the availability of a recipient of a communication. Within calendar system 306, for a time period, a user may designate a location, a subject matter, a general availability, which communication devices at which a user can receive communications, which requesters the user will receive communications from, other participants in the task, and other information collected from other systems and entered by the user to indicate current activity. Further, according to an advantage, a time period entry in a calendar system 306 for a user may indicate backup recipients for communications received by the user during the time period, where backup recipients may be further specified according to multiple factors including, but not limited to, the subject matter of the intended communication and the requester of the intended communication.

Further, in one embodiment, a backup directory system 308 includes general backup recipients for a user. Backup recipients may be identified by user ID or by a general grouping. Further, backup recipients may be specified according to multiple factors such as the subject matter of the intended communication and requester of the intended communication.

It is important to note that a single user may register information at multiple directory systems, calendar systems, and backup systems. For example, a single user may register for multiple IM IDs, each supported by a different instant messaging communication controller and by a different messaging agent at a client system. In another example, a single user may maintain a business calendar on a calendar system that is a remote server and a personal calendar on a calendar system that is a client system. Thus, query support system 314 and chat support system 310 may access multiple directory systems, calendar systems, and backup systems to identify a userID for an intended recipient and to identify backup recipients for communications when an intended recipient is unavailable.

In addition, it is important to note that communication controller 312 and chat support system 310 may operate independent of any single messaging service carrier and may operate independent of one another. For example, chat support system 310 may be implemented within a business network to detect messaging requests from multiple communication systems controllers operating outside the business network.

Further, it is important to note that chat support system 310 may determine whether an intended recipient or backup recipient is available or unavailable by checking the selected status availability indicator, as received from a client system, and searching calendars for current scheduled activity. In addition, chat support system 310 may detect actual activity of an intended or backup recipient by detecting which devices (not depicted) accessible to the intended or backup recipient are in use and by detecting other actual activity through devices that monitor a user's activity. Then, chat support system 310 may adjust an availability setting for an intended or backup recipient based on the recipient's actual activity and scheduled activity. For example, if a user sets a status availability indicator to "available", but chat support system 310 receives an indication that the user is on the phone, chat support system 310 may change the user's status to "unavailable" and add a time delay to the user's unavailability based on the user's actual activity. In another example, if a user sets a status availability indicator to "available", but chat support system 310 detects a scheduled conference call, then chat support system 310 may change the user's status to "unavailable".

With reference now to FIG. 4, there is depicted a block diagram illustrating entries in a directory system, calendar system, and backup system for a particular intended recipient in accordance with the method, system, and program of the present invention.

Chat support system 310 may identify at least one directory entry, such as directory system entry 404. In the example, directory system entry 404 includes the user ID listings for a user named "John Adler". In particular, an email address, a personal IM ID, a business IM ID, a work phone number, and cell phone number are listed as user IDs for "John Adler". In addition, dynamic information about the user's job description, such as the current projects and business role for "John Adler" are listed. As previously described, query support system 314 may search directory system entry 404 to find a user ID for "John Adler" for the type of messaging request of which he is an intended recipient. In addition, as previously described, query support system 314 may search directory system entry 404 with parsed search information to determine if "John Adler" fits the profile for an intended recipient of a messaging request. It is important to note that directory system entry 404 may be collected from a single directory system or compiled from results returned from multiple directory systems.

In addition, chat support system 310 may identify at least one calendar entry specified for a current time period, such as calendar system entry 406. In the example, calendar system entry 406 includes a time period specification of "Monday" from "10 AM-1 PM". During this time period specification, the user "John Adler" is designated to be located at a doctor's appointment and available for communications requests received by cell phone, but not for messaging requests. In an alternate embodiment, a calendar system entry 406 that indicates that a user is away from the office may be analyzed by chat support system 310 which infers, based on the user's location or current activity, that the user is not available for responding to messaging requests.

In particular, during this time period specification in calendar system entry 406, backups are designated for chat messaging requests where "John Adler" is the intended recipient based on the identity of the requester of the chat messaging session. For example, if the chat request is received from "Dr. Smith", then the backup recipient is "wife" and if the chat request is received from "James Davis", then the backup recipient is "employee C", where "employee C".

In addition, during this time period specification in calendar system entry 406, backups are designated for chat messaging requests where "John Adler" is the intended recipient based on the intended subject matter for the chat communication. For example, if the intended subject matter of the request is "project XY", then the backup recipient is "employee A" and if the subject matter of the request is "project Z", then the first backup recipient is "employee D" and the second backup recipient is "administrator A".

When a user specifies a backup recipient preference based on the requester identity or the intended subject matter of the communication, the user may also specify whether to disclose the identity of the backup recipient to the requester when the messaging request is distributed to the backup recipient. In the example, backup recipient "wife" and "employee A" are designated as "(blind)" to indicate that the user does not want the requester notified of the backup recipient's identity.

In addition, when a user specifies a backup recipient preference, the user may also specify whether to disclose to the requester that the messaging request is distributed to a backup recipient. In the example, backup recipient "employee C" is designated as "(no disclose)" to indicate that the user does not want the requester notified that the chat messaging request was distributed to a backup recipient.

Further, when a user specifies a backup recipient preference, the user may also specify what level of available depth to allow for a distribution of a messaging request to a backup recipient. In particular, the level of available depth indicates whether to distribute the messaging request to a backup recipients' backup if the user's first backup recipient is not available. In the example, following each backup recipient designation is a number in parenthesis that indicates the level of available depth to allow in searching for a backup recipient. For example, for the backup recipient "wife" includes a level of available depth of "0", "employee C" includes a level of available depth of "2", "employee A" includes a level of available depth of "1" and "employee D" and "administrator A" both have a level of available depth of "0". Thus, for "wife", "employee D", and "administrator A", if the backup recipient is not available, then no additional action is taken to distribute the messaging request. If "employee C" is not available, however, then a calendar system entry and backup system entry for "employee C" may be accessed and a backup for "employee C" selected to receive the messaging request. If the backup for "employee C" is not available, then another level of backups may be accessed. It will be understood that a user may further specify, with the level of available depth, whether to bar certain backup recipients and may assign a particular security clearance level requirement to any potential backup where a level of available depth of one or more is allowed. Further, it will be understood that if no backups are available, then chat support system 310 may select a default backup.

Additionally, when a user specifies a backup recipient preference, the user may also specify what priority to give a particular backup recipient when more than one backup recipient is specified for a particular criteria. For example, for messaging requests with an intended subject matter of "project Z", two backup recipients are specified, where "employee D" is given first priority as a backup recipient and "administrator A" is given second priority as a backup recipient.

Moreover, when a user specifies a backup recipient preference, the user may also specify whether the requester is blocked from initiating a first reply message entry once the messaging request from the requester is distributed to the backup recipient. For example, the user has selected that the requester will be blocked from initiating the first reply entry if the backup recipient is "employee D" as indicated by "(BLOCK REPLY)".

Further, in the example, a backup system entry 408 includes backup designations independent of a calendar time period. In the example, backups are specified for phone calls and chat communications according to requester. In one example, if "John Adler" is not available to take a phone call, then those users designated in "employee group A" are searched for availability and the phone call is distributed to a backup recipient. In another example, if "John Adler" is not available to respond to a chat message detected from an internal address, then the chat messaging request is distributed to a backup "SamJones". In particular, a business may implement a chat communication controller within the business network, where each employee is assigned a chat ID and an employee may specify a backup recipient for all messaging requests generated from an internal employee chat ID.

Referring now to FIG. 5, there is depicted an illustrative example of a backup preference interface through which a user may select backup preferences in accordance with the method, system, and program of the present invention. As depicted, a chat backup specification window 502 is an interface through which a user may interact by entering keystrokes, voice commands, pointer controls, and other inputs as will be understood in the art of user interfaces.

In particular, a user may select chat messaging request criteria, such as who the chat request is from, as depicted at reference numeral 504, the intended subject matter of the chat request, as depicted at reference numeral 508, and other criteria specifiable by the user. In specifying the "from" criteria at reference numeral 504, a user may specify multiple requesters and may specify requesters by individual name, group name, or other distinguishable criteria. In specifying the "subject matter" criteria at reference numeral 506, a user may specify multiple subject matter criteria and may specify subject matter by topic, keyword, phrase, project, or other distinguishable criteria. In addition, it will be understood that additional criteria and types of criteria specifications may be implemented.

Next, a user may select a backup recipient, as depicted at reference numeral 510. In particular, in specifying the "backup recipient", the user may specify multiple recipients and assign a priority to each recipient. Further, the user may specify a backup recipient by an individual name or may specify a group of recipients, where the first available person in the group will then be selected as the backup recipient. It will be understood that an additional window may depict a directory of available backup recipients and that a user may select backup recipients to fill in at reference numeral 510 from the additional directory window.

Further, a user may select whether to keep the identity of the backup recipient undisclosed to the requester by selecting the "blind" preference depicted at reference numeral 512. In addition, a user may select whether to disclose that the chat request is distributed to a backup by selecting the "no disclose" preference depicted at reference numeral 516. Moreover, a user may select whether to allow a requester who is notified of the distribution of the messaging request to a backup recipient to initiate a first message entry to the backup recipient by selecting the "block reply" preference depicted at reference numeral 515.

Additionally, a user may select whether to associate a time period with the chat backup preference. In the example, a user may select a button to "open calendar" as depicted at reference numeral 518, which will trigger a calendar window in which the user may highlight a portion of the schedule to associated with the chat backup preference. Alternatively, although not depicted, a user may trigger chat backup specification window 502 from a calendaring application, where the chat backup preferences selected within chat backup specification window 502 are then associated with a selected time period by the calendaring application.

Figure 6A:
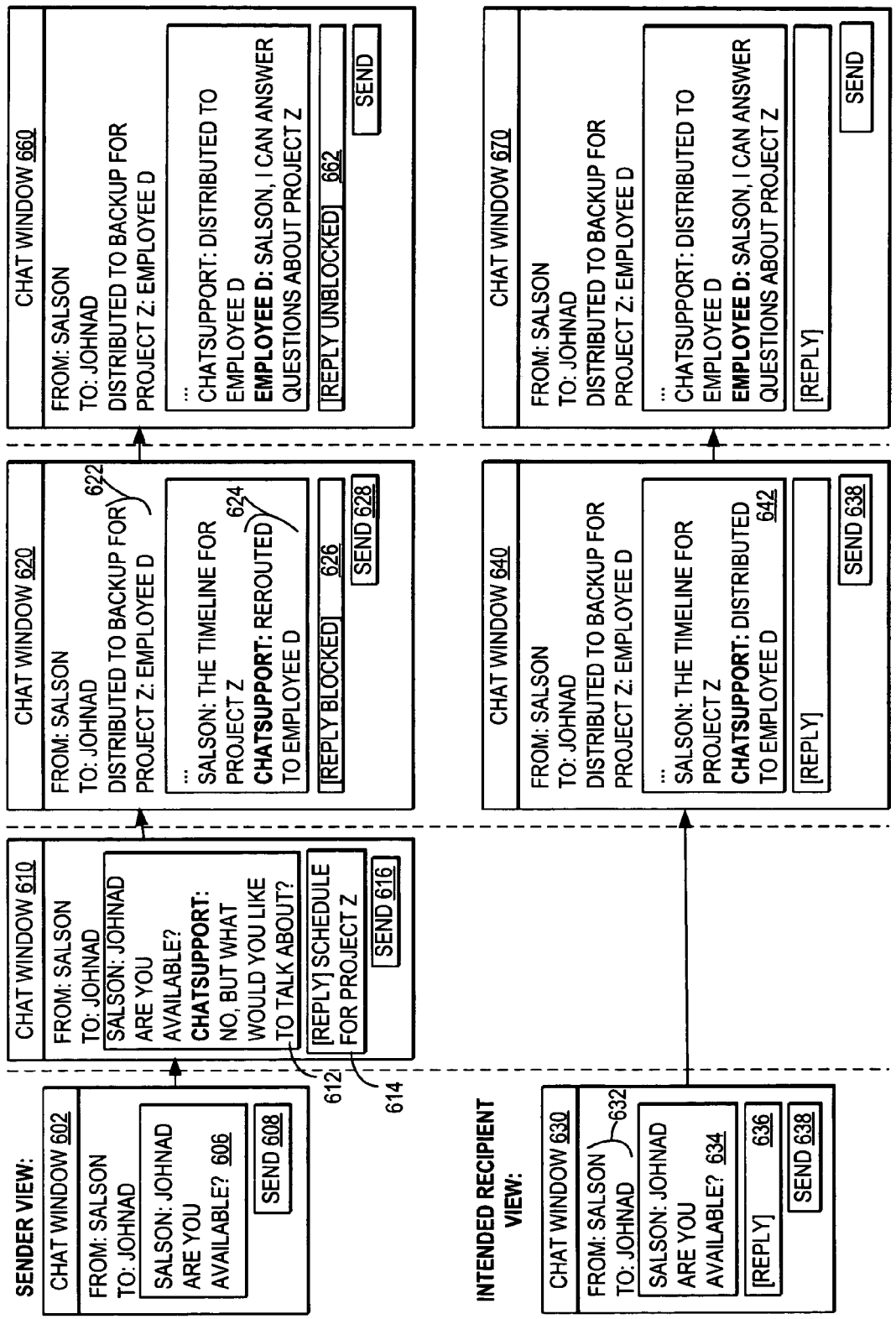
FIGS. 6A-6B is an illustrative example depicting a distribution of a communication request to a backup recipient selected based on the intended subject matter of the communication.
Figure 6B:
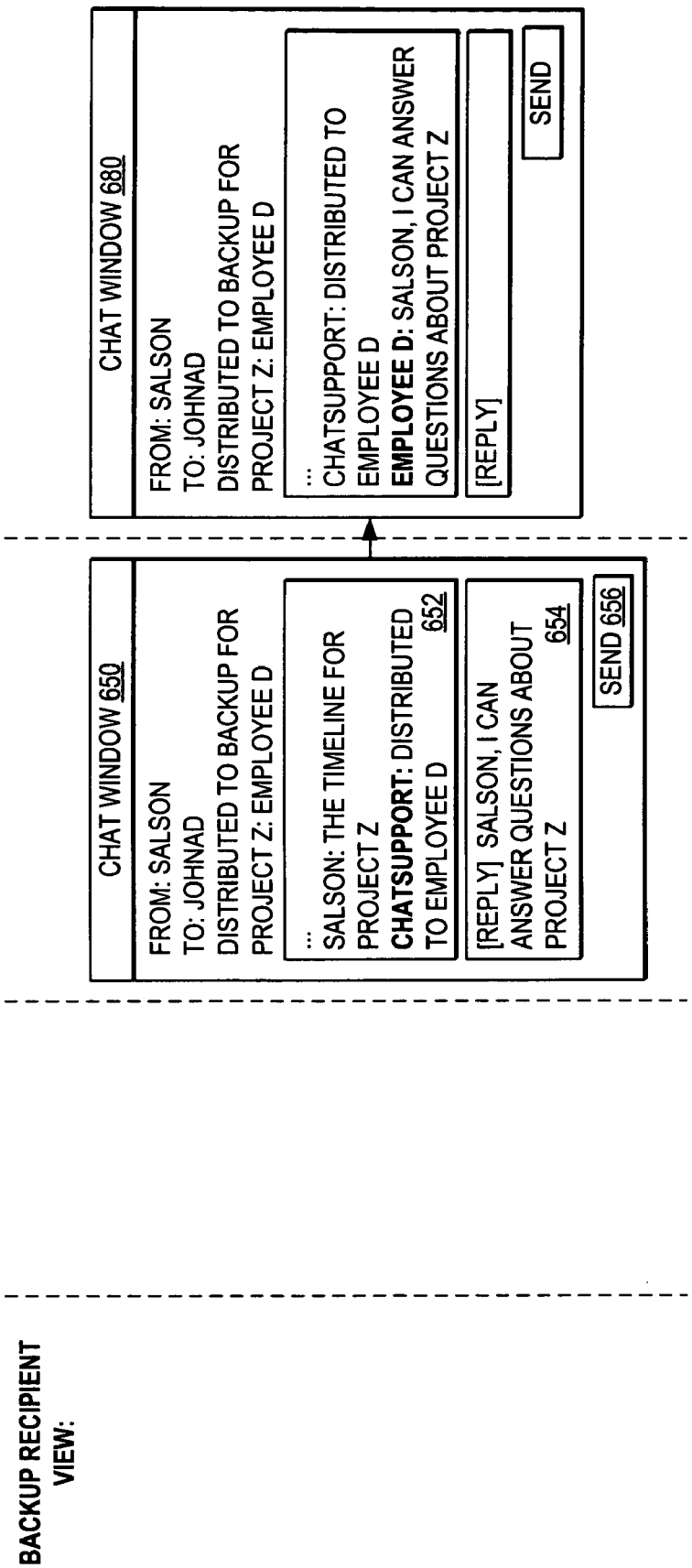

With reference now to FIGS. 6A-6B, there is depicted an illustrative example of a distribution of a messaging request to a backup recipient selected based on the intended subject matter of the communication. As illustrated, a requester "SALSON" initiates a communication to intended recipient "JOHNAD" via chat start window 602. In the initial messaging request, SALSON includes a message 606 and selects to send the message by selecting send button 608. A particular communication server or group of communication servers may support a communication channel between a client system used by requester "SALSON" and a client system used by the intended recipient "JOHNAD".

A communication controller receives the messaging request to initiate a messaging session from the requester messaging agent facilitating chat start window 602 and distributes the messaging request to a intended recipient messaging agent at a client system logged on to by "JOHNAD". The intended recipient messaging agent then facilitates display of a window 630 depicting the messaging request. As illustrated, window 630 includes an indicator of who the request is from and to, as depicted at reference numeral 632. Further, window 630 includes the message entered by the requester, as depicted at reference numeral 634, an area to enter a reply as illustrated at reference numeral 636, and a selectable send button 638. In particular, in this embodiment, it is assumed that intended recipient "JOHNAD" is not available to respond to the messaging request, but is logged on via the intended recipient messaging agent so that messaging requests are still passed to the intended recipient messaging agent as the messaging requests occur.

In addition, chat support system 310 detects the messaging request initiated through chat start window 602 from the requester messaging agent and determines whether intended recipient "JOHNAD" is available. As previously described, chat support system 310 may reference directory system entry 404, calendar system entry 406, backup system entry 408 to determine the availability and backups for "JOHNAD". Alternatively, chat support system 310 may be initiated when a communication controller determines that the intended recipient is unavailable. In the example, assuming that the time period during which the messaging request is initiated is within the time period referenced in calendar system entry 404, chat support system 310 will (1) determine that the intended recipient "JOHNAD" is not available for chat communications; and (2) return a request to the requester for an intended subject matter of the communication. In particular, in the example, chat support system 310 may control prompting a requester for an intended subject matter by becoming a participant in the messaging session or by opening a separate messaging session to prompt the requester, for example. Chat support system 310 then uses the intended subject matter provided by the requester to select a backup recipient for the subject matter requested.

In one example, window 610 indicates that the communication is from "chatsupport" to "SALSON" with a next message entry depicted at reference numeral 612 prompting "SALSON" to indicate an intended subject matter. As depicted at reference numeral 614, "SALSON" enters a reply of "the timeline for project Z" and selects to send the message entry through selection of send button 616. In particular, in the example depicted, window 610 may be a new window or window 610 may be an updated version of window 602 with the next message entry depicted at reference numeral 612.

Chat support system 310 receives the reply and (1) parses the reply from "SALSON"; (2) compares the parsed message with the subject matter backup criteria; (3) detects "employee D" as the designated backup for chat requests about "project Z"; and (4) distributes the message request to "employee D", "JOHNAD", and "SALSON".

In the example, chat support system 310 directs communication controller 312 to distribute the messaging session to "employee D" and to update the messaging windows for "JOHNAD" and "SALSON" to indicate the distribution. As depicted, window 620 indicates that the messaging request has been distributed to a backup recipient and the identity of the backup recipient as indicated at reference numeral 622. Further, a message entry indicated at reference numeral 624 indicates from "chatsupport" that the messaging request was distributed and provides a reply block 626 and a selectable send button 628. Further, as depicted, window 640 updates window 630 with the message entries exchanged between "chatsupport" and "SALSON" as illustrated at reference numeral 642. In addition, as depicted, window 650 is displayed to "employee D" with the complete message log, as illustrated at reference numeral 652.

In particular, in the example, chat support system 310 detects that the backup recipient is designated as one with which the requester is blocked from initiating. As illustrated in reply block 626, the requester is notified that replies are blocked, however, once "employee D" initiates a first message entry, then the requester reply block is removed, as illustrated at reference numeral 662 in window 660.

Next, "employee D" responds with an initial message entry, as depicted at reference numeral 654 and through selection of send button 656, and communication controller 312 directs the response to "SALSON" as depicted in window 660 and to "JOHNAD" as depicted in window 670. Additionally, window 680 shows the updated message log for the view of "employee D".

It is important to note that while in the depicted example the message log displayed for the intended recipient is concurrently updated with the message entries by the requester and the backup recipient, in alternate embodiments, the message log may be stored during the messaging session and then at the conclusion of the messaging session or at different periods throughout the messaging session, the intended recipient messaging agent is updated with the message log. Further, it is important to note that throughout the messaging session depicted, additional updates to message logs displayed at the requester messaging agent, intended recipient messaging agent, and the backup recipient messaging agent may occur which were not depicted herein.

Figure 7A:
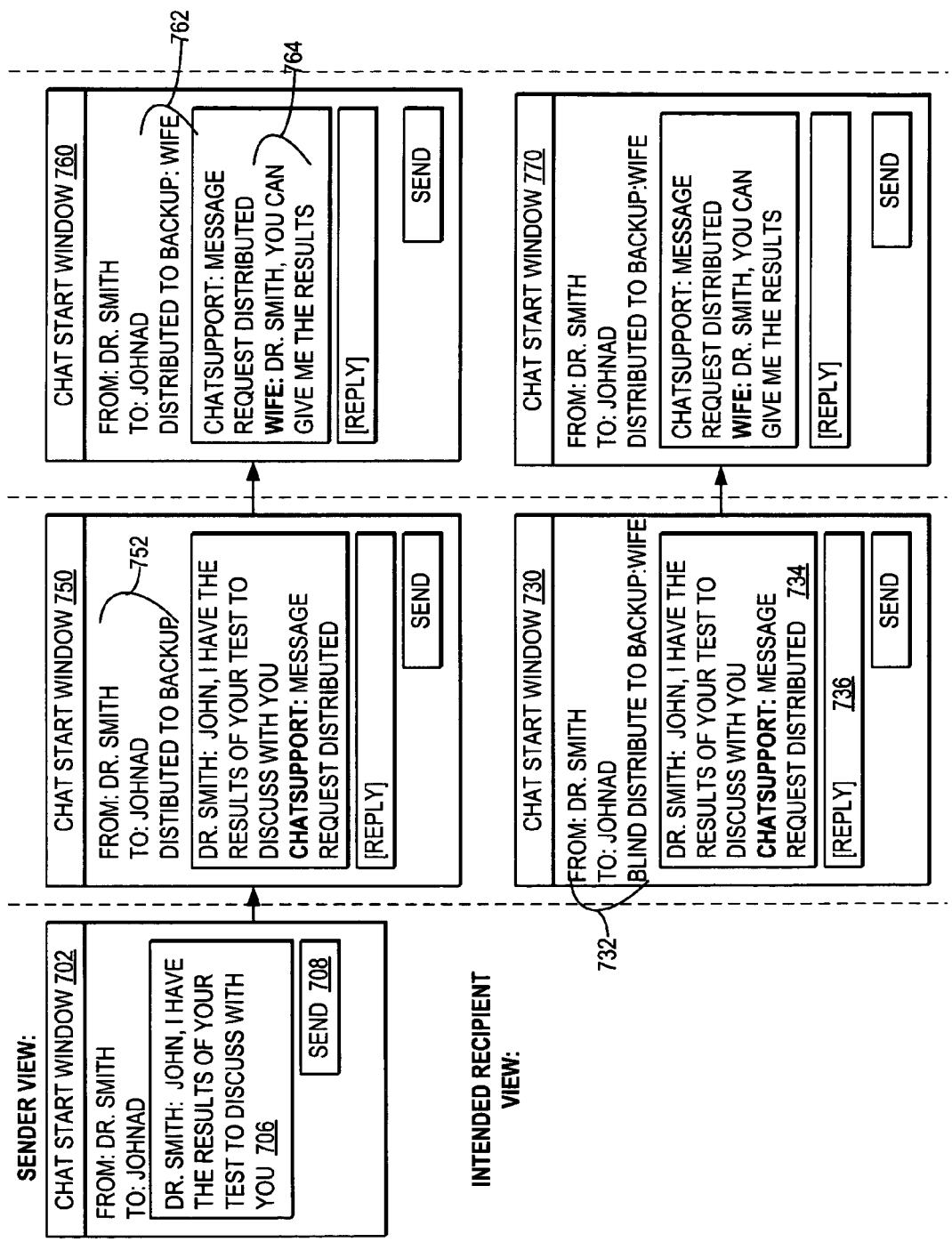
FIGS. 7A-7B is an illustrative example depicting a distribution of a communication request to a blind backup recipient selected based on the identity of the requester.
Figure 7B:
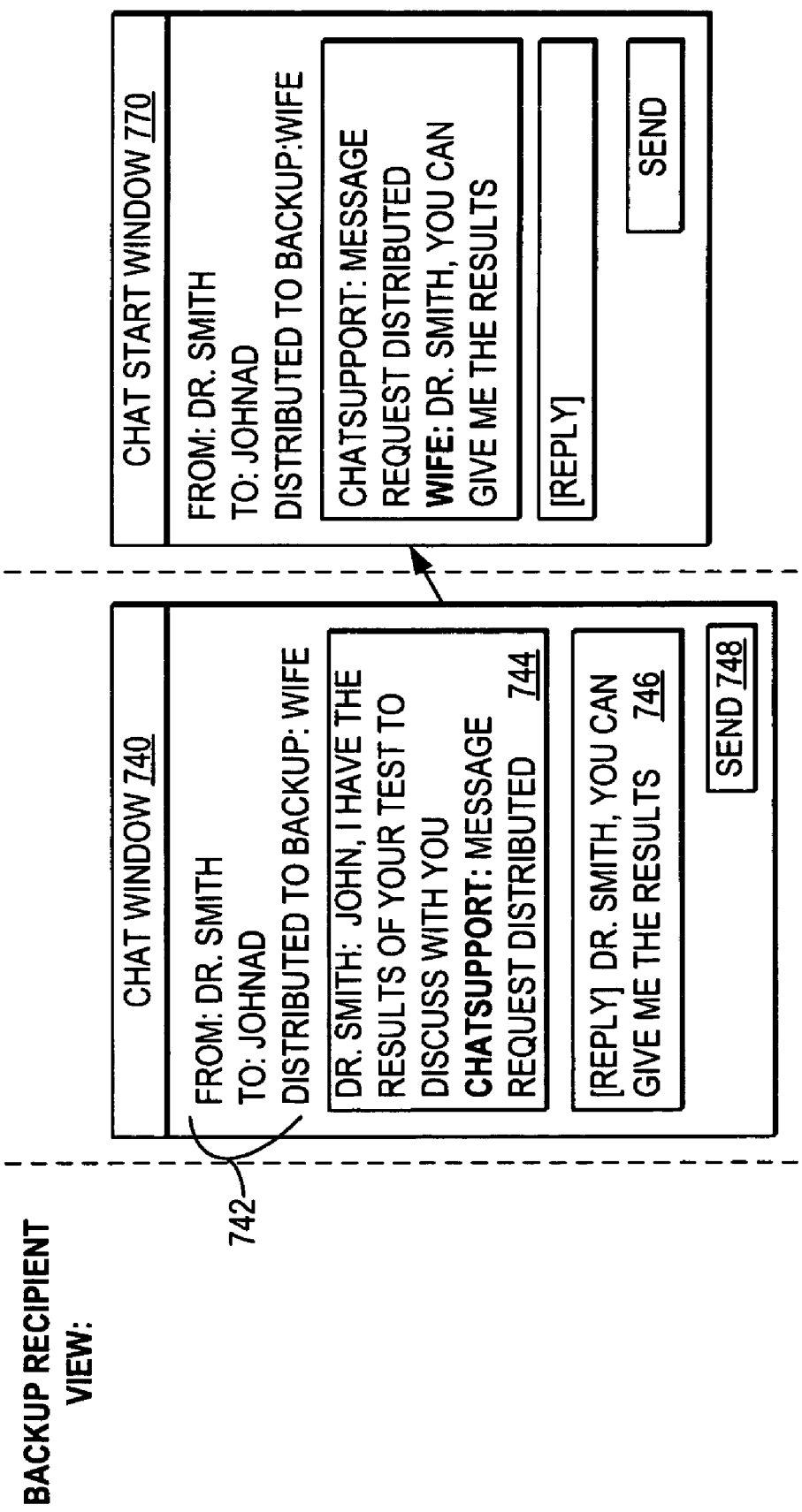

Referring now to FIGS. 7A-7B, there is depicted an illustrative example of a distribution of a messaging request to a blind backup recipient selected based on the identity of the requester. As illustrated, a requester "DR. SMITH" initiates a communication to intended recipient "JOHNAD" via chat start window 702. In the initial messaging request, "DR. SMITH" adds a message entry 706 and selects to send the message by selecting send button 708. A particular communication server or group of communication server may support a communication channel between a client system used by requester "DR. SMITH" and a client system used by the intended recipient "JOHNAD".

A communication controller receives the request to send the messaging request initiated through chat start window 702 facilitated by a requester messaging agent and distributes the messaging request to an intended recipient messaging agent logged on to by "JOHNAD". The intended recipient messaging agent enables display of a window 730 depicting the messaging request. As illustrated, window 730 includes an indicator of who the request is from and to and that the message request is distributed to a backup recipient, as depicted at reference numeral 732. Further, window 730 includes the message entered by the requester, as depicted at reference numeral 734 and an area to enter a reply as illustrated at reference numeral 736.

In addition, when chat support system 310 detects the messaging request, chat support system 310 determines whether intended recipient "JOHNAD" is available. For purposes of example, chat support system 310 references directory system entry 404, calendar system entry 406, and backup system entry 408 to determine the availability and backups for "JOHNAD". In the example, assuming that the time period during which the messaging request is initiated is within the time period referenced in calendar system entry 404, chat support system 310 will (1) determine that the intended recipient "JOHNAD" is unavailable for chat communications; (2) selects "wife" as the designated backup for chat requests from "Dr. Smith", where "wife" is a blind backup; and (3) distributes the chat request to "wife" and updates "Dr. Smith" that the messaging request is distributed, but does not indicate the backup recipient.

As depicted, a window 750 includes an updated message log as depicted at reference numeral 752 with a message entry that informs "Dr. Smith" that the message has been distributed to a backup recipient, but does not indicate the identity of the backup recipient. In one embodiment, "Dr. Smith" may blindly direct a reply to the backup recipient or wait for the backup recipient to reply.

As illustrated, a window 740 depicting the messaging request is displayed via a client system accessible to "wife". As illustrated at reference numeral 742, the backup recipient "wife" receives a messaging request indicating that the messaging request was originally directed to "JOHNAD". In addition, a message log depicted at reference numeral 744 is updated with the message entry by "chatsupport" indicating that the message has been distributed to a backup recipient. As illustrated at reference numeral 746, backup recipient "wife" enters a reply message and upon selecting selectable send button 748, initiates sending the reply message entry to "Dr. Smith".

As depicted, responsive to backup recipient "wife" entering a reply, the addressing area of window 760 is updated with the identity of the backup recipient, as indicated at reference numeral 762, and the message log in window 760 for the requester is updated with the reply message entry, as indicated at reference numeral 764 and the message log in window 770 is updated for the intended recipient "JOHNAD" with the reply message. In one embodiment, the sender may select the backup recipient identifier within window 760 to access additional information about the backup recipient identifier or request authentication of the backup recipient, for example. In addition, the message log of window 780 is updated with the reply message entry.

In the example depicted, when "wife" replies to the messaging request, the identity of "wife" is unblinded. It will be understood, however, that in alternate embodiments, the identity of a blind backup recipient may not be revealed when the blind backup recipient replies to the messaging request.

Figure 8:
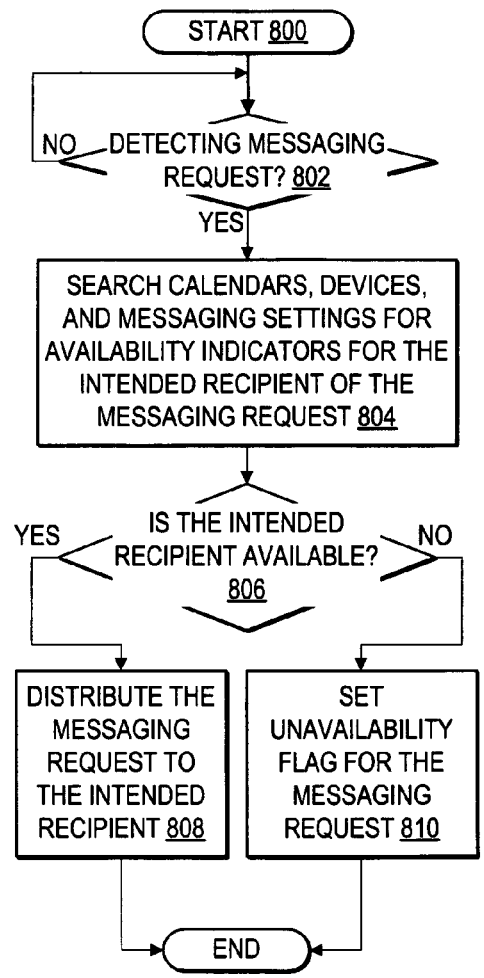
FIG. 8 is a high level logic flowchart depicting the process and program for managing messaging requests in accordance with the method, system, and program of the present invention.

With reference now to FIG. 8, there is depicted a high level logic flowchart for the process and program for managing messaging requests in accordance with the method, system, and program of the present invention. As illustrated, the process which may be performed by a communication system for facilitating messaging service starts at block 800 and thereafter proceeds to block 802. Block 802 depicts a determination whether a messaging request is detected. Once a messaging request is detected, then the process passes to block 804. Block 804 depicts searching calendars, devices, and messaging settings for availability indicators for the intended recipient of the messaging request. Availability indicators may include explicit indicators of whether an intended recipient is available or not and implicit indicators based on the intended recipient's current activity or lack of activity. Next, block 806 illustrates a determination of whether the intended recipient is available. If the intended recipient is available, then the process passes to block 808. Block 808 depicts distributing the messaging request to the intended recipient, and the process ends. Otherwise, at block 806, if the intended recipient is not available, then the process passes to block 810. Block 810 depicts setting the unavailability flag for the messaging request, and the process ends. In particular, although not depicted, setting the unavailability flag may automatically trigger a chat support system. Further, selections of steps or all of the steps of the process described in FIG. 8 may be performed by a chat support system.

Figure 9B:
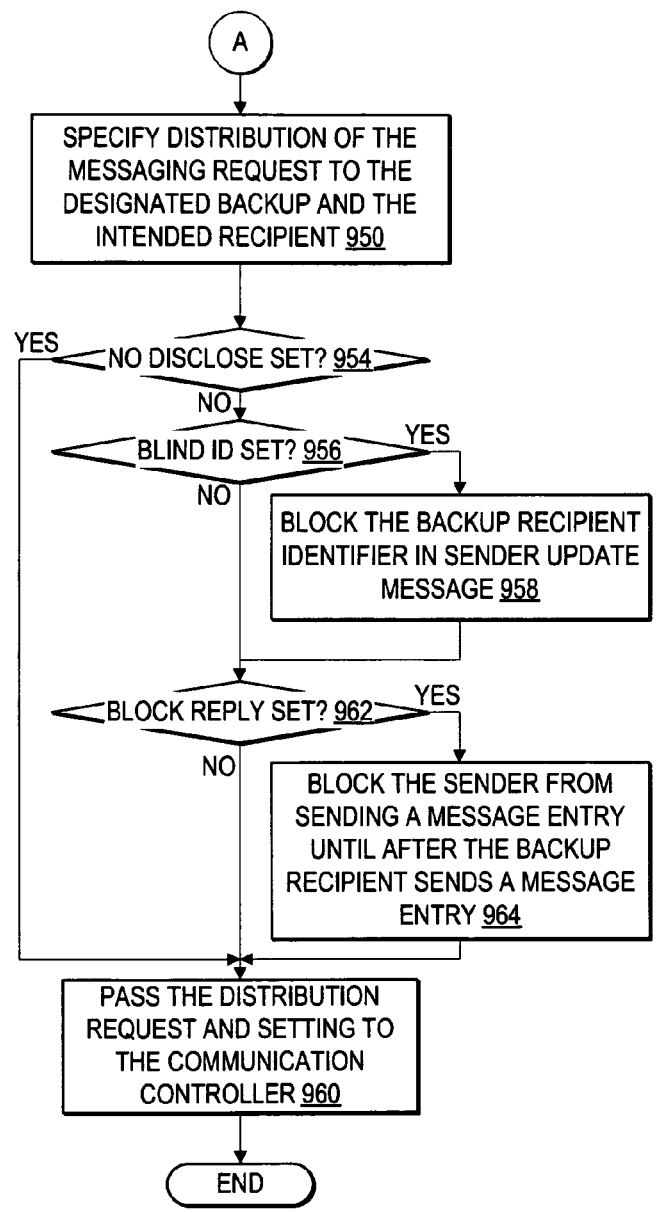
FIGS. 9A-9B is a high level logic flowchart depicting a process and program for facilitating distribution of messaging requests intended for a recipient who is unavailable to a particular backup recipient in accordance with the method, system, and program of the present invention.
Figure 9A:
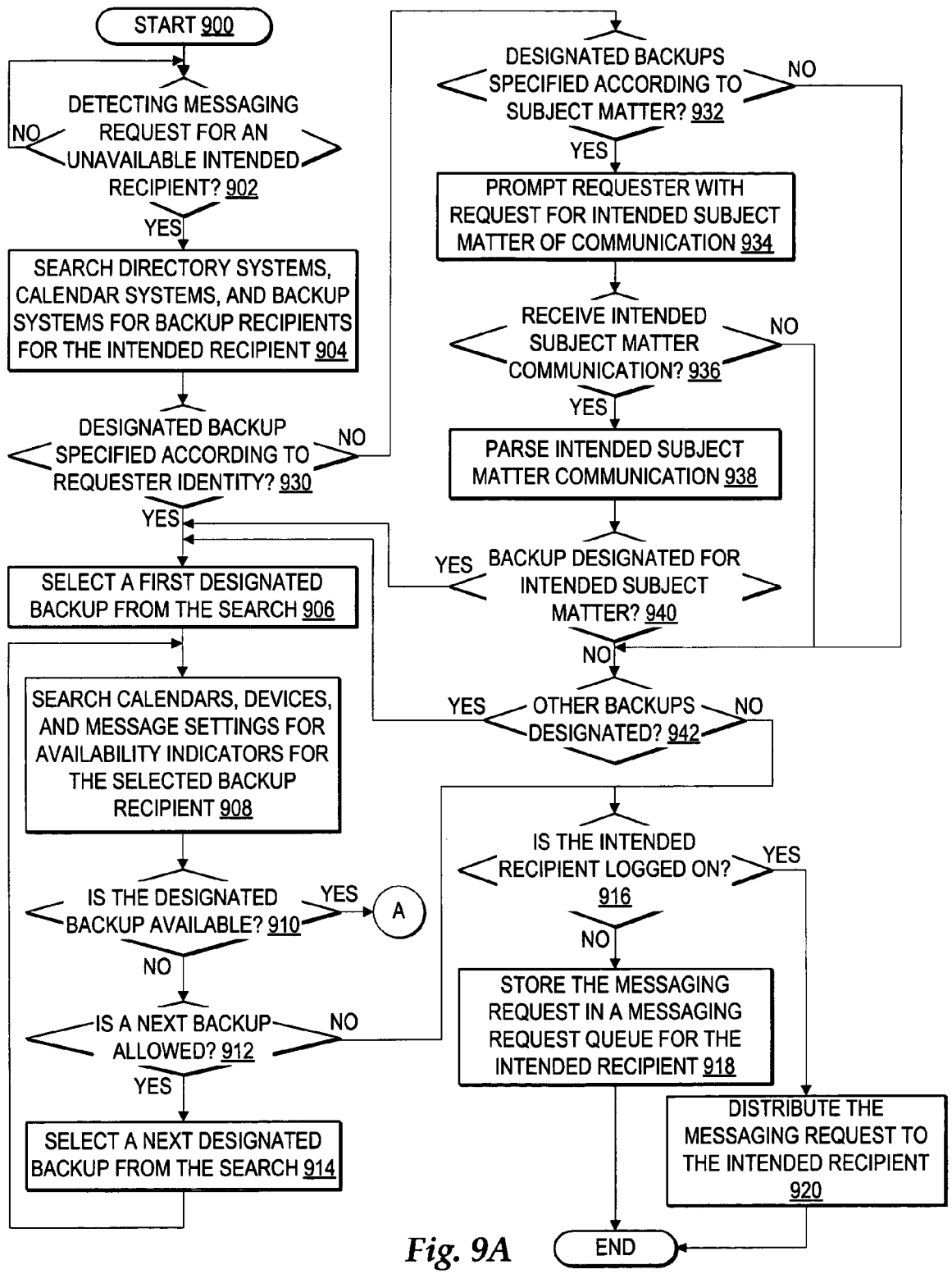

Referring now to FIGS. 9A-9B, there is depicted a high level logic flowchart of a process and program for facilitating distribution of messaging requests intended for a recipient who is unavailable to a particular backup recipient in accordance with the method, system, and program of the present invention. As depicted, the process, which may be performed by a chat support system, starts at block 900 and thereafter proceeds to block 902. Block 902 depicts a determination whether the chat support system detects a messaging request for an unavailable intended recipient. In particular, the chat support system may detect when the unavailability flag is set in the process described in FIG. 8 or the chat support system may perform an independent analysis of availability indicators for each messaging request to determine the availability of the intended recipient. Once the chat support system detects a messaging request for an unavailable intended recipient, the process passes to block 904.

Block 904 depicts searching directory systems, calendar systems, and backup directory systems for backup recipients for the intended recipient. Next, block 930 depicts a determination whether there is a designated backup selected because the current requester identity matches a specified requester identity. If there is a designated backup based on the current requester identity matching a specified requester identity, then the process passes to block 906. Otherwise, at block 930, if there is not a designated backup based on the current requester identity matching a specified requester identity, then the process passes to block 932.

Block 932 depicts a determination whether there are designated backups specified according to subject matter. If there are not designated backups specified according to subject matter, then the process passes to block 942. Block 942 depicts a determination of whether there are other applicable designated backups. If there are other applicable designated backups, then the process passes to block 906. Otherwise, if there are not other applicable designated backups, then the process passes to block 916. Block 916 illustrates a determination whether the intended recipient is logged on. If the intended recipient is logged on, then the process passes to block 920 which depicts requesting distribution of the message request to the intended recipient, and the process ends. If the intended recipient is not logged on, then the process passes to block 918, which illustrates storing the message request in a message request queue for the intended recipient, and the process ends.

Returning to block 932, if there are designated backups specified according to subject matter, then the process passes to block 934. Block 934 depicts prompting the requester with a request for the intended subject matter of the communication. Next, block 936 illustrates a determination whether the intended subject matter of the communication is received in a communication from the requester. If the intended subject matter of the communication is not received, then the process passes to block 942, and the process continues, as previously described. Otherwise, if the intended subject matter of the communication is received, then the process passes to block 938. Block 938 depicts parsing the intended subject matter communication for subject keywords. Next, block 940 depicts a determination whether there is a backup designated for the intended subject matter. If there is a backup designated for the intended subject matter, then the process passes to block 906. If there is not a backup designated for the intended subject matter, then the process passes to block 942, and the process proceeds, as previously described. It is important to note that in the present process, the backup order preference is set first for requester identity based criteria matches, second for intended subject matter based criteria matches, and third for all other criteria matches. In alternate embodiments, however, the backup order preference may designate a different order for the criteria used for selecting a backup recipient.

Turning now to block 906, block 906 depicts selecting a first designated backup from the search. In particular, the first designated backup is selected either at block 930, block 940, or block 942, in that order. However, it will be understood that in alternate embodiments, the order in which a first designated backup is selected may vary. Next, block 908 depicts searching calendars, devices, and message settings for availability indicators for the selected backup recipient. Therefore, block 910 illustrates a determination whether the designated backup is available. If the designated backup is available, then the process passes to block 912. Block 912 depicts a determination whether a next backup is allowed. If a next backup is not allowed, then the process proceeds to block 916. If a next backup is allowed, then the process passes to block 914. Block 914 illustrates selecting a next designated backup discovered during the previous search or performing an additional search to select a next designated backup, and the process passes to block 908.

Returning to block 910, if the designated backup is available, then the process passes to block 950 in FIG. 9B. Block 950 depicts specifying the distribution of the messaging request to the designated backup and the intended recipient. In one example, specifying the distribution of the messaging request requires the chat support system to designate the type of messaging session and participants that needs to be initiated. Next, block 952 depicts passing the distributing messaging requests to the communication controller. Thereafter block 954 illustrates a determination whether a "no disclose" is set for the backup recipient. If a "no disclose" is set for the backup recipient, then the requester is not informed of the distribution, and the process passes to block 960. If a "no disclose" is not set for the backup recipient, then the process passes to block 956. Block 956 depicts a determination whether a "blind ID" is set for the backup recipient. If a "blind ID" is not set for the backup recipient, then the process passes to block 962. Otherwise, at block 956, if a "blind ID" is set for the backup recipient, then the process passes to block 958. Block 958 depicts blocking the backup recipient identifier in the requester update message, and the process passes to block 962.

Block 962 depicts a determination whether the "block reply" is set. If the "block reply" is not set, then the process passes to block 960. If the "block reply" is set, then the process passes to block 964. Block 964 depicts blocking the sender from sending a message entry until after the backup recipient sends a message entry, and the process passes to block 960.

Block 960 illustrates passing the distribution request and distribution settings to the communication controller, and the process ends. In particular, the distribution request specifies the type of communication channel to open and the distribution setting specifies the disclosure, blind ID and block reply settings. In specifying the type of communication channel, the chat support system may designate whether to open a new messaging session, add the backup recipient to the existing messaging session, or create other types of messaging and communication channels available for enabling a messaging session between the requester and the backup recipient.

While the invention has been particularly shown and described with reference to a preferred embodiment, it will be understood by those skilled in the art that various changes in form and detail may be made therein without departing from the spirit and scope of the invention.

What is claimed is:

1. A computer-implemented method for identifying a backup recipient for a chat message request when an intended recipient of said chat message request is unavailable to participate in a chat session, comprising:

detecting, at an instant messaging communication service provider system for facilitating chat sessions via a network between a plurality of separate users enabled to log in to said instant messaging communication service provider at a plurality of separate client systems, a chat messaging request from a requester from among said plurality of users to said intended recipient from among said plurality of users;

determining, at said instant messaging communication service provider system, whether said intended recipient is available to respond to said chat messaging request from said requester;

responsive to determining that said intended recipient is unavailable to respond to said messaging request from said requester, searching, at said instant messaging communication service provider system, at least one from among a directory entry for said intended recipient and a schedule for said intended recipient to identify a particular designated backup from among a plurality of separate designated backups to said intended recipient from among said plurality of users, wherein at least one characteristic of said chat messaging request matches at least one from among a current time period, a requester identity, and an intended subject matter specified in association with said particular designated backup;

distributing, by said instant messaging communication service provider system, said chat messaging request to said particular designated backup, wherein said particular designated backup is enabled to select whether to participate in a chat session by responding to said chat messaging request.

2. The computer-implemented method according to claim 1 for identifying a backup recipient for a chat message request, wherein determining whether said intended recipient is available to respond to said chat messaging request from said requester, further comprises:

detecting whether said intended recipient is available by analyzing at least one from among a chat messaging application setting indicating whether said intended recipient is responding to chat communications, a calendar entry for a current time period comprising at least one indicator of a current location of said intended recipient, a time delay in availability caused by said intended recipient's actual current activity, and a device availability status for a device associated with said intended recipient.

3. The computer-implemented method according to claim 1 for identifying a backup recipient for a chat message request, wherein searching at least one from among a directory entry for said intended recipient and a schedule for said intended recipient to identify a particular designated backup from among a plurality of separate designated backups to said intended recipient from among said plurality of users, wherein at least one characteristic of said chat messaging request matches at least one from among a current time period, a requester identity, and an intended subject matter specified in association with said particular designated backup, further comprises:

prompting said requester, by said instant messaging communication service provider server, in a chat message requester interface of a client system logged onto by said requester with a request for said requester to specify an intended subject matter of a communication proceeding from said chat message request;

responsive to receiving a particular intended subject matter specified by said requester, parsing said particular intended subject matter for at least one subject keyword; and searching, by said instant messaging communication service provider server, at least one from among said directory entry for said intended recipient and said schedule for said intended recipient for said particular designated backup specified to respond to said message request for said at least one subject keyword.

4. The computer-implemented method according to claim 1 for identifying a backup recipient for a chat message request, wherein searching at least one from among a directory entry for said intended recipient and a schedule for said intended recipient to identify a particular designated backup from among a plurality of separate designated backups to said intended recipient from among said plurality of users, wherein at least one characteristic of said chat messaging request matches at least one from among a current time period, a requester identity, and an intended subject matter specified in association with said particular designated backup, further comprises:

identifying a selection of backups from among said plurality of separate designated backups, wherein said at least one characteristic of said chat messaging request matches at least one from among said current time period, said requester identity, and said intended subject matter specified in association with each of said selection of backups from among said plurality of separate designated backups; and selecting said particular designated backup from among said selection of backups based on a backup order preference.

5. The computer-implemented method according to claim 4 for identifying a backup recipient for a chat message request, further comprising:

detecting whether said particular designated backup is available to respond to said chat message request;

responsive to detecting that said particular designated backup is available to respond to said chat message request, distributing said chat messaging request to said particular designated backup;

responsive to detecting that said particular designated backup is unavailable to respond to said chat message request, selecting a next designated backup from among said selection of backups;

responsive to identifying said next designated backup, detecting whether said next designated backup is available to respond to said chat message request; and responsive to detecting that said next designated backup is available to respond to said chat message request, distributing said chat messaging request to said next designated backup.

6. The computer-implemented method according to claim 1 for identifying a backup recipient for a chat message request, further comprising:

detecting said chat messaging request from said to said intended recipient, wherein said intended recipient is only identified by a role of said intended recipient and an intended subject matter of a chat session initiated from said chat messaging request;

comparing said role of said intended recipient and said intended subject matter of said chat session with at least one of a database matching said plurality of users to a plurality of separate roles and qualifications to discuss a plurality of separate subject matter to identify at least user specified to fill said role and qualified to discuss said intended subject matter; and selecting said at least one user as said intended recipient.

7. The computer-implemented method according to claim 1 for identifying a backup recipient for a chat message request, wherein distributing said chat messaging request to said particular designated backup, further comprises:

opening, by said instant messaging communication service provider server, a communication channel for a chat session between a first client system logged onto by said particular designated backup and a second client system logged onto by said requester;

sending said chat messaging request identifying an identity for said requester, an identity for said intended recipient, and an indicator that said chat messaging request is directed to said particular designated backup because said intended recipient is unavailable from said instant messaging communication service provider server to said first client system logged onto by said designated backup, wherein said chat messaging request is displayed to said designated backup at said particular client system; and updating, by said instant messaging communication service provider server, a chat messaging request interface at said second client system logged into by said requester to include an entry identifying that said chat messaging request is directed to a backup recipient.

8. A system for identifying a backup recipient for a chat message request when an intended recipient of said chat message request is unavailable to participate in a chat session, comprising:

an instant messaging communication service provider system enabled to detect a chat messaging request from a requester from among a plurality of users to said intended recipient from among a plurality of users via a communication network and facilitate chat sessions via said communication network between said plurality of users enabled to log in to said instant messaging communication service provider at a plurality of separate client systems;

said instant messaging communication service provider system further comprising:

means for determining whether said intended recipient is available to respond to said chat messaging request from said requester;

means, responsive to determining that said intended recipient is unavailable to respond to said messaging request from said requester, for searching at least one from among a directory entry for said intended recipient and a schedule for said intended recipient to identify a particular designated backup from among a plurality of separate designated backups to said intended recipient from among said plurality of users, wherein at least one characteristic of said chat messaging request matches at least one from among a current time period, a requester identity, and an intended subject matter specified in association with said particular designated backup;

means for distributing said chat messaging request to said particular designated backup, wherein said particular designated backup is enabled to select whether to participate in a chat session by responding to said chat messaging request.

9. The system according to claim 8 for identifying a backup recipient for a chat message request, wherein said means for determining whether said intended recipient is available to respond to said chat messaging request from said requester, said instant messaging communication service provider system further comprising:

means for detecting whether said intended recipient is available by analyzing at least one from among a chat messaging application setting indicating whether said intended recipient is responding to chat communications, a calendar entry for a current time period comprising at least one indicator of a current location of said intended recipient, a time delay in availability caused by said intended recipient's actual current activity, and a device availability status for a device associated with said intended recipient.

10. The system according to claim 8 for identifying a backup recipient for a chat message request, wherein said means for searching at least one from among a directory entry for said intended recipient and a schedule for said intended recipient to identify a particular designated backup from among a plurality of separate designated backups to said intended recipient from among said plurality of users, wherein at least one characteristic of said chat messaging request matches at least one from among a current time period, a requester identity, and an intended subject matter specified in association with said particular designated backup, further comprises:

means for prompting said requester in a chat message requester interface of a client system logged onto by said requester with a request for said requester to specify an intended subject matter of a communication proceeding from said chat message request;

means, responsive to receiving a particular intended subject matter specified by said requester, for parsing said particular intended subject matter for at least one subject keyword; and means for searching at least one from among said directory entry for said intended recipient and said schedule for said intended recipient for said particular designated backup specified to respond to said message request for said at least one subject keyword.

11. The system according to claim 8 for identifying a backup recipient for a chat message request, wherein said means for searching at least one from among a directory entry for said intended recipient and a schedule for said intended recipient to identify a particular designated backup from among a plurality of separate designated backups to said intended recipient from among said plurality of users, wherein at least one characteristic of said chat messaging request matches at least one from among a current time period, a requester identity, and an intended subject matter specified in association with said particular designated backup, further comprises:

means for identifying a selection of backups from among said plurality of separate designated backups, wherein said at least one characteristic of said chat messaging request matches at least one from among said current time period, said requester identity, and said intended subject matter specified in association with each of said selection of backups from among said plurality of separate designated backups; and means for selecting said particular designated backup from among said selection of backups based on a backup order preference.

12. The system according to claim 11 for identifying a backup recipient for a chat message request, said instant messaging communication service provider system further comprising:

means for detecting whether said particular designated backup is available to respond to said chat message request;

means, responsive to detecting that said particular designated backup is available to respond to said chat message request, for distributing said chat messaging request to said particular designated backup;

means, responsive to detecting that said particular designated backup is unavailable to respond to said chat message request, for selecting a next designated backup from among said selection of backups;

means, responsive to identifying said next designated backup, for detecting whether said next designated backup is available to respond to said chat message request; and means, responsive to detecting that said next designated backup is available to respond to said chat message request, for distributing said chat messaging request to said next designated backup.

13. The system according to claim 8 for identifying a backup recipient for a chat message request, said instant messaging communication service provider system further comprising:

means for detecting said chat messaging request from said to said intended recipient, wherein said intended recipient is only identified by a role of said intended recipient and an intended subject matter of a chat session initiated from said chat messaging request;

means for comparing said role of said intended recipient and said intended subject matter of said chat session with at least one of a database matching said plurality of users to a plurality of separate roles and qualifications to discuss a plurality of separate subject matter to identify at least user specified to fill said role and qualified to discuss said intended subject matter; and means for selecting said at least one user as said intended recipient.

14. The system according to claim 8 for identifying a backup recipient for a chat message request, wherein said means for distributing said chat messaging request to said particular designated backup, said instant messaging communication service provider system further comprises:

means for opening a communication channel for a chat session between a first client system logged onto by said particular designated backup and a second client system logged onto by said requester;

means for sending said chat messaging request identifying an identity for said requester, an identity for said intended recipient, and an indicator that said chat messaging request is directed to said particular designated backup because said intended recipient is unavailable to said first client system logged onto by said designated backup, wherein said chat messaging request is displayed to said designated backup at said particular client system; and means for updating, by said instant messaging communication service provider server, a chat messaging request interface at said second client system logged into by said requester to include an entry identifying that said chat messaging request is directed to a backup recipient.

15. A program for identifying a backup recipient for a chat message request, said program embodied in a non-volatile or volatile computer-readable medium, said program comprising computer-executable instructions which cause a computer to perform the steps of:

detecting, at an instant messaging communication service provider system for facilitating chat sessions via a network between a plurality of separate users enabled to log in to said instant messaging communication service provider at a plurality of separate client systems, a chat messaging request from a requester from among said plurality of users to an intended recipient from among said plurality of users;

determining whether said intended recipient is available to respond to said chat messaging request from said requester;

responsive to determining that said intended recipient is unavailable to respond to said messaging request from said requester, searching at least one from among a directory entry for said intended recipient and a schedule for said intended recipient to identify a particular designated backup from among a plurality of separate designated backups to said intended recipient from among said plurality of users, wherein at least one characteristic of said chat messaging request matches at least one from among a current time period, a requester identity, and an intended subject matter specified in association with said particular designated backup;

distributing said chat messaging request to said particular designated backup, wherein said particular designated backup is enabled to select whether to participate in a chat session by responding to said chat messaging request.

16. The program according to claim 15 for identifying a backup recipient for a chat message request, wherein said step of searching at least one from among a directory entry for said intended recipient and a schedule for said intended recipient to identify a particular designated backup from among a plurality of separate designated backups to said intended recipient from among said plurality of users, wherein at least one characteristic of said chat messaging request matches at least one from among a current time period, a requester identity, and an intended subject matter specified in association with said particular designated backup, further comprises the steps of:

prompting said requester, by said instant messaging communication service provider server, in a chat message requester interface of a client system logged onto by said requester with a request for said requester to specify an intended subject matter of a communication proceeding from said chat message request;

responsive to receiving a particular intended subject matter specified by said requester, parsing said particular intended subject matter for at least one subject keyword; and searching, by said instant messaging communication service provider server, at least one from among said directory entry for said intended recipient and said schedule for said intended recipient for said particular designated backup specified to respond to said message request for said at least one subject keyword.

17. The program according to claim 15 for identifying a backup recipient for a chat message request, wherein said step of searching at least one from among a directory entry for said intended recipient and a schedule for said intended recipient to identify a particular designated backup from among a plurality of separate designated backups to said intended recipient from among said plurality of users, wherein at least one characteristic of said chat messaging request matches at least one from among a current time period, a requester identity, and an intended subject matter specified in association with said particular designated backup, further comprises the steps of:

identifying a selection of backups from among said plurality of separate designated backups, wherein said at least one characteristic of said chat messaging request matches at least one from among said current time period, said requester identity, and said intended subject matter specified in association with each of said selection of backups from among said plurality of separate designated backups; and selecting said particular designated backup from among said selection of backups based on a backup order preference.

18. The program according to claim 17 for identifying a backup recipient for a chat message request, said program further comprising the steps of:

detecting whether said particular designated backup is available to respond to said chat message request;

responsive to detecting that said particular designated backup is available to respond to said chat message request, distributing said chat messaging request to said particular designated backup;

responsive to detecting that said particular designated backup is unavailable to respond to said chat message request, selecting a next designated backup from among said selection of backups;

responsive to identifying said next designated backup, detecting whether said next designated backup is available to respond to said chat message request; and responsive to detecting that said next designated backup is available to respond to said chat message request, distributing said chat messaging request to said next designated backup.

19. The program according to claim 15 for identifying a backup recipient for a chat message request, said program further comprising the steps of:

detecting said chat messaging request from said to said intended recipient, wherein said intended recipient is only identified by a role of said intended recipient and an intended subject matter of a chat session initiated from said chat messaging request;

comparing said role of said intended recipient and said intended subject matter of said chat session with at least one of a database matching said plurality of users to a plurality of separate roles and qualifications to discuss a plurality of separate subject matter to identify at least user specified to fill said role and qualified to discuss said intended subject matter; and selecting said at least one user as said intended recipient.

20. The program according to claim 15 for identifying a backup recipient for a chat message request, wherein said step of distributing said chat messaging request to said particular designated backup, further comprises the step of:

opening, by said instant messaging communication service provider server, a communication channel for a chat session between a first client system logged onto by said particular designated backup and a second client system logged onto by said requester;

sending said chat messaging request identifying an identity for said requester, an identity for said intended recipient, and an indicator that said chat messaging request is directed to said particular designated backup because said intended recipient is unavailable from said instant messaging communication service provider server to said first client system logged onto by said designated backup, wherein said chat messaging request is displayed to said designated backup at said particular client system; and updating, by said instant messaging communication service provider server, a chat messaging request interface at said second client system logged into by said requester to include an entry identifying that said chat messaging request is directed to a backup recipient.

* * * * *